Oct. 25, 1966   S. H. WILLISTON   3,281,596
METHOD OF DETECTING MERCURY VAPOR BY COLLECTING THE
MERCURY AND THEREAFTER ANALYZING THE COLLECTED
MERCURY BY ULTRAVIOLET ABSORPTION ANALYSIS
Filed March 23, 1964
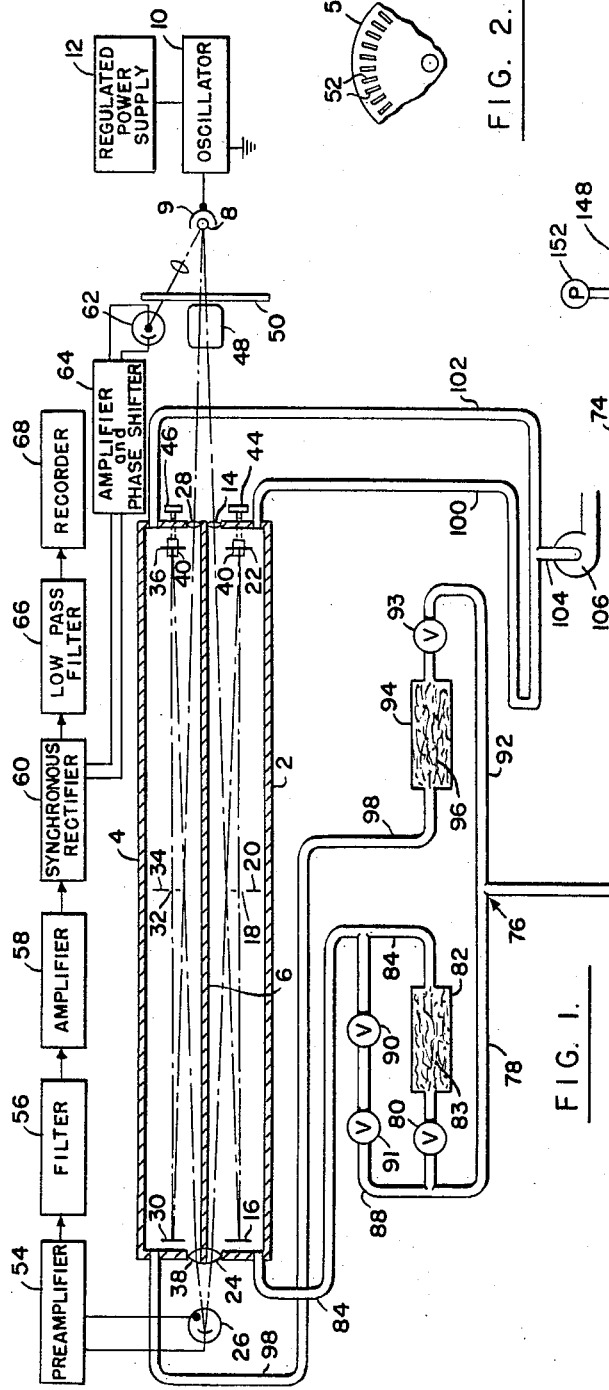
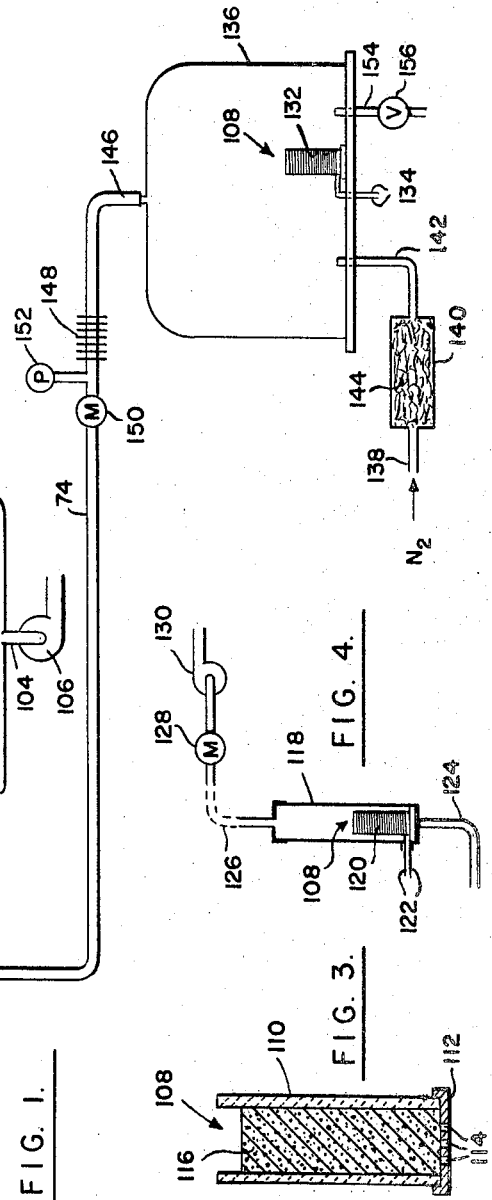
INVENTOR.
SAMUEL H. WILLISTON
BY
ATTORNEYS

United States Patent Office 3,281,596
Patented Oct. 25, 1966

3,281,596
METHOD OF DETECTING MERCURY VAPOR BY COLLECTING THE MERCURY AND THEREAFTER ANALYZING THE COLLECTED MERCURY BY ULTRAVIOLET ABSORPTION ANALYSIS
Samuel H. Williston, Los Altos, Calif., assignor to Cordero Mining Company, Palo Alto, Calif., a corporation of Nevada
Filed Mar. 23, 1964, Ser. No. 353,910
5 Claims. (Cl. 250—43.5)

This invention relates to a method and apparatus for detection and measurement of mercury vapor in air, and particularly for measurement of extremely low mercury vapor concentration.

In Williston Patent 3,178,572, dated April 13, 1965, there is disclosed an apparatus for the detection and measurement of minute concentrations of mercury vapor in air. As pointed out therein, measurements of mercury concentration may be made when the air contains less than $4 \times 10^{-9}$ grams per cubic meter. The usual objectives for measuring mercury vapor concentration at such levels are to locate deposits of mercury or of other metals which contain mercury in small amounts and hence may be identified by mercury vapor measurements.

The measurement of even smaller concentrations of mercury vapor may be accomplished in accordance with the present invention by utilizing activated carbon as an adsorber. Activated carbon is found to have advantages far exceeding those of other adsorbing materials. First, it may be substantially completely freed of adsorbed mercury by heating to a moderate and practically handled temperature of the order of 1300° F. While metals such as gold are excellent adsorbers of mercury vapor, they have the disadvantage of holding the mercury unless subjected to very high temperatures (for example in the case of gold near its melting point) for long periods, whereas carbon will give up its mercury content practically completely if heated to a temperature in the vicinity of 1300° F. for only 3 minutes.

While activated carbon is, as is well known, a very active adsorbing agent, and by no means selective, it may be used in accordance with the invention in a procedure in which its broad range of adsorption is not detrimental. Specifically it is used as follows:

Air in the region undergoing examination for mercury vapor content is drawn through a bed of activated carbon previously heated, as described, to remove from the practical standpoint all of its mercury content. Because of its highly adsorptive properties a quite large volume of air, desirably metered, may be drawn through the carbon bed since its adsorbing activity ceases (i.e. it becomes saturated) only when quite large amounts are adsorbed. While active it removes practically every trace of mercury.

By the above procedure the total mercury in a very large volume of air may be concentrated in a small amount of the activated carbon.

The carbon is then removed to a chamber in which heating is effected to drive the mercury out of the carbon into a mercury-free body of a gas, preferably nitrogen. This gas may be of relatively small volume compared to the air from which adsorption was effected, and consequently the gas will then contain a high concentration of mercury per unit volume. This gas is then supplied to an apparatus of the type disclosed in said patent. In supplying the gas to the apparatus, it is split into two samples, one of which is examined in its unchanged condition while the other is freed of mercury by passing it through a porous adsorbent preferably of gold which is selective for mercury, that is will not adsorb such other substances as may have been adsorbed by the activated carbon and driven out into the gas. Thus the gas of both samples will contain the substances other than mercury and being identical in composition so far as these substances are concerned they will be balanced out in the measuring system.

The general objects of the invention have to do with the achievement of the results which have been outlined. These and other objects relating to details of procedure and apparatus used will become apparent from the following description, read in conjunction with the accompanying drawing, in which:

FIGURE 1 is a mechanical-electrical diagram illustrating a preferred apparatus used in accordance with the invention;

FIGURE 2 is a fragmentary view showing the construction of the chopper for the illumination;

FIGURE 3 is a vertical section through a cartridge assembly containing activated carbon; and FIGURE 4 is a diagram illustrating the use of the cartridge of FIGURE 3 for adsorption of mercury from air.

There will first be described the preferred apparatus which is used in carrying out the invention, this being basically that of said patent to which reference may be made for details of operation.

Referring to FIGURE 1, there are shown at 2 and 4 a pair of tubes which, as will appear later, contain gas samples which are to be compared. In brief, one of these, in this case tube 4, will contain flowing gas (nitrogen) containing the mercury vapor, while the other tube 2 will contain gas from the same source but with the mercury vapor removed. These tubes, desirably blackened internally by a baked enamel, are closed except for lens elements formed of quartz or ultraviolet-transmitting glass. The tubes are desirably of substantially identical dimensions, and are separated by a plane wall 6, so that the tubes may be close to each other to provide an optimum optical system, as will appear.

A mercury vapor light source is provided at 8 and emits the characteristic radiation of ionized mercury vapor. Desirably, as indicated, this is in the form of a tube of small diameter extending perpendicular to the plane of FIGURE 1. The mercury lamp tube is most desirably of ordinary low pressure type such as is commonly used for therapeutic purposes, such a tube being superior to a high pressure lamp in that the most useful radiation is in the 2537 A. band which is reversible, and in a high pressure lamp the mercury vapor about that region which is emitting may provide substantial absorption cutting down the effectiveness of the useful radiation. In a low pressure lamp about 75% of the radiation is in the 2537 A. band, the remainder being in the higher ultraviolet and in the visible band. A small diameter tube is used to provide what is substantially a line source. While the illumination may then not be as intense as may be secured from a larger diameter tube, an advantageous optical system is thereby simply secured, as will become more apparent later, and the high sensitivity of the multiplier photocell which is used makes high intensity illumination unnecessary.

For present purposes, the tube 8 is not desirably energized by current flowing conventionally between electrodes, since it is found that the energization, by low frequency alternating current, causes plasma oscillation and reduces the overall sensitivity of the apparatus. Instead, therefore, electrodes may be grounded and excitation is provided at high radio frequency by surrounding the tube with an exterior electrode 9 provided with an opening through which the radiation may pass from the tube. Excitation is effected by feeding this exterior electrode 9 with high frequency current from an oscillator 10. The frequency of the oscillator may be crystal-controlled at about 30 megacycles. This frequency is rather arbitrary and not critical, though desirably constant to produce uniformity of result. By using such high frequency energization substantially continuous ionization is provided, the interval between cycles being so short that deionization does not occur. The frequency of the order cited is very much higher than the chopping frequency which is used as hereafter described. To secure constant operation, the oscillator is energized by a regulated power supply 12. The power supply and oscillator may be of any suitable type such as commonly used for continuous wave radio communication purposes and they need, therefore, not be described in detail.

Considering first the tube 2, a quartz lens 14 of convex type effects projection of rays from the lamp 8 along the path indicated by construction lines, which path includes a reflecting mirror 16, a slit 18 in a mask 20, a mirror 22, and, conveniently, a half quartz lens 24, the whole effecting projection of the involved rays on the cathode of the mutliplier photocell 26 which is diagrammed as a simple photocell though it will be understood that besides its cathode it contains the usual dynodes and anode provided with supply current from a conventional type of source. This mutliplier photocell is operated in accordance with conventional good practice, though in view of the nature of the operation here involved, the extreme precautions in operation sometimes used with mutliplier photocells are not necessary.

Using a long tube 2, it will be evident that the path of the illumination therethrough is roughly three times its length, and a long length of tube is desirable in the case of each of tubes 2 and 4, which involve identical optical paths, so that interposed in the case of the latter tube there is a maximum amount of mercury vapor. The length of the tubes, however, is limited by practical considerations of thermal and mechanical stability.

The lens 14 is of suitable long focal length so as to focus the line image of the lamp 8 on the slit 18 by way of the mirror 16. Desirably the mask 20 is adjustable by conventional means (not shown) so that a sharp focus on the slit 18 is achieved at the 2537 A. band which is desirably used. Because of the fact that the lens 14 is not achromatic, peripheral rays from illumination at other wave lengths will not be brought to a sharp focus at the slit which is desirably very narrow, and consequently a large percentage of this other radiation will be blocked off by the mask. Axial rays are desirably blocked off by central masks on or near the lens since axial rays of all wave lengths would pass through the slit. While the monochromator action thus secured is far from perfect, there is achieved a considerable increase in the ratio of the desired illumination at 2537 A. to the other illumination of both higher and lower wave lengths forming a background.

It may here be noted that further discrimination against the undesired background illumination may be achieved by the use of a multiplier photocell having relatively low sensitivity to unwanted wave lengths. Such a cell is Dumont K–1688 which is insensitive to illumination above 3000 A. and has only low sensitivity in the 2800 A.–3000 A. band, but has a high sensitivity in the reversible 2537 A. band.

An identical optical system is provided in the tube 4 by the lens 28, the mirror 30, the slit 32 in the mask 34, the mirror 36 and the half lens 38, the system being desirably arranged and focused as above described for the first system and directed on the same portion of the cathode of the mutliplier phototube as receives the illumination from the first system. To secure balanced adjustments, with the same length of optical path, the mirrors 22 and 36 are desirably pivotally carried by sliding blocks 40 and 42 adjusted by the screws 44 and 46. It will be understood that the other elements of the systems are also made capable of small fine adjustments to secure identical paths and proper focusing.

A motor 48 drives a chopper disc 50 which is provided with radial slits 52 through which pass the beams from the lamp 8 to both of the optical systems. As will be evident from the positioning of the chopper disc shown in FIGURE 1, the two beams are alternately intercepted and passed so that alternating illumination is provided on the photocell 26. Desirably the sits are dimensioned so that when one ray is being passed the other is occulted, and vice versa, to give a maximum response as will shortly appear. Desirably the motor 48 is of a non-synchronous type, for example an induction motor with slip, so that, assuming a power supply for the system at a given frequency, the frequency of chopping does not have a common factor with the supply frequency. This aids, by reason of synchronous rectification, in suppressing stray signals which might emanate from the power supply which may be, for example, at 60 cycles or 400 cycles, or some other frequency as may be conveniently used.

The multiplier photocell 26 feeds a preamplifier 54 in conventional fashion, and the signals from the preamplifier are desirably filtered at 56 utilizing, for example, one or more parallel-T filters to suppress noise signals such as may originate from the alternating power supply. The filter 56 is followed by the amplifier 58 which feeds the synchronous rectifier 60 receiving a reference signal from the photocell 62 through the amplifier and phase shifter 64. The photocell 62 is illuminated from the lamp 8 through the slits 52. The technique of synchronous rectification is well-known and may be carried out as described in Shawhan Patent 2,559,173. Synchronous rectification gives rise to a direct, though possibly varying, output as the result of passage of the signals through a low pass filter 66 which feeds a recorder 68 to provide a recorded curve in conventional fashion.

What occurs in the electrical system is the following:

Pulses appear in alternation at the output from the photocell 26 and if there is any difference in the illumination from the two paths the successive pulses will differ in amplitude giving rise to an alternating signal component at the frequency of a chopping cycle. Through the filter 56 optimizing of the signal occurs by suppression of the noise signals at other frequencies, and in the synchronous rectifier this alternating signal is controlled by the reference signal at the same frequency and adjusted in phase with it by the phase shifter at 64. The synchronous rectifier gives rise to the direct output which is passed through the filter 66 to the recorder 68. Low duration transients are removed largely by filter 56 and substantially completely by the action of the sychronous rectifier. The low pass filter 66 removes any alternating components of the output from the synchronous rectifier so that the input to the recorder is in the form of a direct signal varying slowly with changes in the relative intensity illumination emitted from the tubes 2 and 4. The alternating signal referred to appears only when there is a difference in this illumination; to the extent that the illumination from the two tubes varies to the same extent in both no signal component appears. As will hereafter appear more clearly, it is to be expected that the composition of the gas contents of the two tubes will change during measurement and this change will be the same for both tubes to the extent of gas components other than mercury. The system is very insensitive to such changes, while highly sensitive to the differences in mercury concentration produced by selective absorption.

Continuing the description of the apparatus, gas, produced as described hereafter, is drawn into the apparatus through a tube 74 by a pump 106. Typically, in operation, a flow of gas of around 1 to 10 liters per minute has been found desirable.

The tube 74 leads to a T 76 connected at one side to a tube 78 which leads through a valve 80 to a mercury-adsorption chamber 82, in turn connected to an inlet to the tube 2 through connection 84. The adsorption tube 82 may be bypassed, for calibration purposes, by a line 88 containing a shut-off valve 90 and also an adjustable valve 91.

The other side of the T 76 is connected through tube 92 and an adjustable valve 93 to a dummy chamber 94 containing a material 96, the tube 94 being connected to the inlet of the tube 4 through connection 98.

The tubes 2 and 4 are connected to the respective outlet tubes 100 and 102 for withdrawal of the gas therefrom, and these are joined at a T 104 connected to the inlet of the pump 106.

The mercury-adsorption chamber 82 contains highly effective adsorption media for the specific removal of mercury from the flowing gas as compared with any other content of the gas. Useful for this purpose is glass wool having its fibers coated with pure gold. A coating of silver, which also specifically removes mercury, as compared with most other constituents of the gas, may also be used, but for this purpose the gas would have to be freed from any hydrogen sulfide and any halogens. Other metals which are characterized by wettability by and some solubility in mercury may be used, again with removal of possible constituents of the gas which might react chemically with the metal, but no metal has been found to be more effective than gold which has the distinct advantage that it will remove all mercury and does not react with or adsorb other constituents which may be expected to be in the gas. The gold may be deposited on the glass wool by ordinary and convenient deposition methods, for example by merely wetting the wool with a gold salt such as chloride and decomposing the salt by heat for deposition of the gold. There may be used in place of glass wool nickel wool in which the gold is deposited in the same fashion or by precipitation of gold by the nickel from a solution of a gold salt. A difficulty with glass wool is that glass will adsorb, to some extent, mercury, and consequently the dummy chamber 94 containing the same amount of glass wool but uncoated, will be required to be saturated to the extent of this adsorption before use. In the case of nickel, however, the adsorption is negligible. Other carriers of gold or silver may be used, such as alumina completely coated to prevent absorption of water. The general properties of the carrier should be those of a physical form to present a maximum adsorbing surface of the noble metal per unit volume, reasonably low resistance to flow, adhesion to its adsorbent coating, and nondestructibility by heat used to drive off mercury. In itself, it should be non-adsorptive of mercury, or at least exhibit uniform adsorption thereof. The last property may be best described by saying that the carrier should be non-wettable by mercury. It should, so as to be usable in the dummy chamber, be non-adsorptive of other substances which absorb the radiation bands absorbed by mercury. The noble metal coating on the carrier should be very thin, ranging from a small fraction of a thousandth of an inch to not more than a few thousandths. The reason for the latter limitation is that if a thick coating of gold, for example, is used the adsorbed mercury will diffuse deeply thereinto and will not be driven off completely in regeneration of the adsorbent by heat at moderate temperatures.

The reason for the dummy chamber 94 is that there should be interposed between the T 76 and the T 104 two branch passages for the gas which involve substantially the same resistance to gas flow during measurement. The reason for this is that the apparatus compares the samples at any instant in the tubes 2 and 4 and it is desirable, therefore, that the sample of gas which is drawn into the apparatus and which enters the T 76 should appear in both tubes simultaneously and leave simultaneously so that the mercury-containing and the mercury-free gas in these tubes should come from the same sample of the source. Accordingly, the dummy chamber 94 contains the same fibrous material 96, glass wool, nickel wool, alumina or other carrier uncoated, as is used in the chamber 82 similarly packed but with the coated carrier.

The connecting tubing should, of course, involve substantially identical lengths in the tube branches to insure the same symmetry of flow.

The apparatus so far described is the same as that of said patent and operates in the same fashion. The special matters relating to the present invention will now be described.

In accordance with the invention a bed of activated carbon is used to adsorb mercury from air in which it appears as a vapor, and while other physical arrangements may obviously be used, it is advantageous to utilize, for convenience of handling, a cartridge of activated carbon which is indicated at 108 in FIGURE 3. This comprises a cylinder 110, desirably of ceramic, provided with a base 112 which may be of platinum and which is provided with openings 114 exaggerated in size in the figure but which should be sufficiently small so as to retain within the cylinder the granular activated carbon providing the bed 116. The cartridge may be of any suitable dimensions but may be conveniently small since even a bed of small volume of the activated carbon will adsorb a large quantity of mercury.

FIGURE 4 is illustrative of an apparatus used for the initial steps of carrying out the invention. This comprises a cylinder 118 in the bottom of which the cartridge 108 may be located within a heating coil 120 of resistance wire the leads 122 to which may pass outwardly through a sealed opening in the cylinder. Inlet to the cylinder is provided through a connection 124 communicating with the openings 114 of the cartridge so that gas or air which enters the cylinder will pass substantially completely through the cartridge. An exit connection 126 communicates through a meter 128 with a pump 130.

The first step in the procedure is desirably that of insuring freedom of the activated carbon from previously adsorbed mercury, and for this purpose the cartridge is heated by current applied through the heating coil 120 while a non-oxidizing gas such as nitrogen is introduced at 124. During this operation the meter 128 may be removed from the line to the pump to avoid damage by hot gas. The pump 130 may also be removed if the inert gas is introduced under pressure. The use of an inert gas such as nitrogen prevents oxidation of the bed during the heating. The heating is effected bringing the activated carbon to a temperature of the order of 1300° F. or above for a period upwards of 3 minutes. Under these conditions any mercury previously in the bed is completely removed and at the same time there would also be removed other substances which may have been adsorbed previously by the bed. In the case of adsorbed organic materials they will be either driven off or decomposed to carbon. In this fashion the bed is brought to a proper adsorbent condition.

Following this heating, the apparatus is permitted to cool and the meter 128 and pump 130 are connected as illustrated, with the inlet 124 arranged to receive air which is to be tested for mercury vapor content. In order to provide quantitative results, the pump 130 has its speed desirably controlled to produce a substantially constant volumetric flow of air as indicated by the meter 128. Knowing the rate of flow and noting the time of the sampling, the total volume of air drawn through the cartridge may be determined. Of course, an integrating volumetric meter may be used if desired. In this fashion any desired volume of air may be drawn through the bed up to quite large quantities. The cool bed will adsorb substantially all mercury contained in the sampled air up to a point at which the bed would become saturated. But since the capability of adsorption of the activated carbon is very high, and considering the extremely low concentration of mercury vapor under conditions of interest, it will be appreciated that the accumulation of mercury may be from very large volumes of air, long before the activated carbon will even approach a saturated condition. The sampling of air may be from a surface region, or it may be drawn from a hole in the earth where it has been found that mercury vapor concentrations are usually considerably higher than in the ambient atmosphere. As sampling from a hole is carried out the hole is desirably dry since water impedes the passage of mercury vapor into the region sampled.

The apparatus and procedure just described is also highly advantageous for the sampling of air well above the surface of the earth and for this purpose the sampling apparatus may be operated in an airplane which may circle about an area to be explored. It may be here remarked that in the exploration it is advantageous to facilitate coverage of large areas by first taking samples over a rather large area to determine whether it contains mercury vapor indicative of the existence of deposits of interest; if results indicate that a mercury vapor content of interest does exist the exploration may then be carried out over smaller areas and in this case explorations may be carried out at the surface to pinpoint regions of maximum concentration.

The activated carbon is not a specific adsorbent of mercury vapor. Atmospheric gases will be adsorbed along with moisture and various organic vapors may exist in the air being sampled. The adsorption of these other materials, however, does not reduce the capability of the activated carbon for adsorption of mercury.

Following the sampling as just described, the cartridge may be removed and placed in a sealed container for transportation to a laboratory where the apparatus of FIGURE 1 is located. While this apparatus may be carried and operated in a truck, or even in an airplane for immediate evaluation of results, its sensitivity is such that desirably it is operated under easily controlled conditions and hence where feasible the final measurements are most desirably carried out in a laboratory. As are evident numerous cartridges may be used for sampling to cover quite large areas in a short period of time and then sent to the laboratory.

What follows in analysis of the contents of the cartridges is illustrated in FIGURE 1. A cartridge 108 is located within a heating coil 132, similar to 120, through which flow of current may be produced through leads 134. The cartridge and heater assembly are located in a vessel 136, such as a bell jar, of definite volume. Provision is made for a relatively slow flow of an inert gas, for example nitrogen, into a connection 138 leading to a chamber 140 and from it into the bell jar as through a connection 142. The chamber 140 is packed with a specific adsorbent for the mercury indicated at 144 which may be of the type previously described at 83, for example glass or nickel wool coated with gold. This is provided to insure that the entering gas is free of mercury though the adsorbent chamber may be omitted if the gas has been previously treated to remove mercury.

The outlet 146 from the bell jar communicates through a cooler 148 and a flowmeter 150 with the connection 74 previously described. Desirably a pressure gauge 152 is provided in the line for observation of pressure so that the rate of flow may be determined with accuracy to permit reduction of the gas flow to standard conditions. Temperatures may also be measured though if an effective cooler is used the temperature of the gas reaching the meter may be maintained substantially constant essentially at ambient air temperature.

The connection 154 controlled by a valve 156 may be used for calibration as described hereafter. In normal operation this valve 156 is closed.

The operation of the apparatus is then as follows:

With the cartridge 108 in place flow of gas (nitrogen) is effected, this flow taking place under the action of the pump 106. The flowing gas should be free of mercury vapor and flow is continued until this is ascertained to be the case by the securing of a minimum reading on the recorder 68. Under these conditions the tubes 2 and 4 will both contain gas free of mercury vapor and identical in composition.

The next step in operation is that of heating the cartridge by current flow through the heating coil 132 to bring the temperature of the cartridge to around 1300° F. or above, the heating being desirably continued for upwards of three minutes. While this heating is taking place the flow of gas may be interrupted so that later the initial measurements will be of gas containing a maximum mercury concentration. The heating will drive out of the activated carbon its content of mercury and also its content of practically all other adsorbed materials, or will effect the decomposition of organic materials. The original mercury content of the cartridge will then be dispersed as a vapor in the volume of gas within the container 136.

Following sufficient heating the current may be either cut off or reduced to a considerably lower temperature to prevent readsorption of the mercury vapor. But if the measurements are carried out in a sufficiently small period of time readsorption will be negligible even if the cartridge is permitted to cool.

Following the foregoing, the apparatus is operated permitting the inert gas to enter at 138 to make up for that removed through the apparatus by the pump 106. The pump 106 is desirably controlled as to speed, and the gas permitted to enter at a valve-regulated rate so that, for best quantitative results, the pressure indicated at 152 is substantially constant and substantially constant flow rate is indicated by the meter 150. If the gas in the container 136 is hot, fixed temperature conditions are achieved at the left of the cooler 148.

The operation of the measuring apparatus is now as described in said patent. The flow is split at the T 76 into two equal streams. One of these passes through the chamber 83, valve 80 being open and valves 90 and 91 being closed, and passes through the tube 2. The other stream passes through the chamber 94 and through the tube 4. The gas flowing through the tube 2 is specifically freed from mercury vapor by the adsorbent 83, but this stream will contain any other substances previously adsorbed by the activated carbon but driven out by the heating. The stream through the tube 4 will contain the mercury vapor present in the chamber 136 and will have the same content of other materials as the stream passing through the tube 2. Even though these other materials may affect the ultraviolet illumination, since the two tubes will at any the contain the same amount thereof there will be no difference in adsorption of the illumination due to these materials and no signal will result. The output signal, at the frequency of chopping is, accordingly, due solely to the mercury vapor content of the gas in the tube 4. Thus a specific determination of mercury results.

It will be evident that as measurement proceeds if the volume of the chamber 136 is much larger than that of the tubes 2 and 4 the initial measurements will be essentially of the content of the chamber 136 following heating and prior to dilution by the incoming gas at 138. But in actuality, it is desirable not to try to displace the gas in 136 by any piston arrangement or liquid displacing media, but rather to use an incoming flow of gas as described. This, nevertheless, makes calculable results possible if calibration is effected, as desirable in any event, by the introduction of a known sample of mercury vapor in a test procedure. This test procedure may be carried out by running a blank test by introducing through passage 154 and valve 156 a sample of gas of definite volume containing a known concentration of mercury vapor. Such a sample may be produced, for example, by drawing into a syringe a sample of nitrogen which has been held over mercury under definite pressure and temperature conditions so as to have become saturated. The saturation concentration will be known. By then operating the apparatus in the same fashion as with an actual sample the significance of the indications for an actual sample may be readily determined to a sufficient practical degree of accuracy.

Matters of adjustment of the apparatus are detailed in said patent and need not be repeated herein.

While operations are most desirably carried out as described, instead of merely removing the mercury by heating the adsorbent activated carbon a sample in which mercury has been adsorbed may be burned in a stream of mercury-free air or oxygen and delivered to the apparatus. However, this adds unnecessary complexity to the apparatus since the mercury can be removed from the activated charcoal merely by heating as described.

While reference has been particularly made to the sampling of air at or near the surface of the earth, it is sometimes desirable to ascertain the mercury content of mineral samples particularly of crude oil which may be found in the earth. Such a material (in the case of solids) may be heated to drive off its mercury content into a stream of gas which can then be passed through the apparatus of FIGURE 4 to produce adsorption of the mercury; or if the material to be tested is organic (as an oil) it may be burned and the products of combustion may be passed through the same apparatus to effect adsorption.

While the measuring apparatus described has been that of Patent 3,178,572, it will be evident that there may be used for measurement of the mercury content of the gas produced by the heating or other treatment of the activated carbon the apparatus described in the patent of Williston and Morris 3,173,016, dated March 9, 1965.

It will now be evident that in accordance with the invention the sample of gas measured, i.e. into which the mercury is vaporized by heating or otherwise treating, e.g. by burning, may contain a much higher concentration of mercury vapor than the original gas from which the mercury was adsorbed. For example, hundreds of cubic feet of air may have its mercury content adsorbed in a few grams of activated carbon, and from this the total mercury content may be vaporized in a few liters of nitrogen or other gas for measurement. The concentration of mercury in the original air or other gas may be determined by taking into account the measured volumes of the gas from which the mercury was adsorbed and that into which it was vaporized for measurement. The effective sensitivity of the measuring apparatus is thus greatly magnified.

It will be evident that various details of method and apparatus involved in carrying out the invention may be modified without departing from the invention as defined in the following claims.

What is claimed is:

1. The method of detecting mercury vapor in minute concentration in a gas comprising
producing a flow of a first volume of said gas in contact with activated carbon initially substantially free from mercury to produce adsorption of the mercury vapor by the carbon;
effecting vaporization of the adsorbed mercury into a second volume of an initially mercury-free second gas substantially less than said first volume to produce in said second volume a higher concentration of mercury vapor than existed in said first volume;
providing samples of said second gas containing the vaporized mercury;
extracting only mercury from only one of said samples;
thereafter transmitting ultraviolet radiation adsorbable by mercury vapor through approximately equal optical paths containing said samples;
and detecting the differential absorption of the ultraviolet radiation by said samples.

2. The method of claim 1 in which a single sample of the second gas is subdivided to provide said samples.

3. The method of claim 1 in which mercury is extracted from the first mentioned sample by absorption by a mercury-wettable metal.

4. The method of claim 3 in which the metal is a noble metal.

5. The method of detecting mercury vapor in minute concentration in a gas comprising
producing a flow of a first measured volume of said gas in contact with activated carbon initially substantially free from mercury to produce adsorption of the mercury vapor by the carbon;
effecting vaporization of the adsorbed mercury into a second measured volume of an initially mercury-free second gas substantially less than said first volume to produce in said second volume a higher concentration of mercury vapor than existed in said first volume;
providing samples of said second gas containing the vaporized mercury;
extracting only mercury from only one of said samples;
thereafter transmitting ultraviolet radiation absorbable by mercury vapor through approximately equal paths containing said samples;
and detecting the differential absorption of the ultraviolet radiation by said samples.

References Cited by the Examiner

UNITED STATES PATENTS

| 2,692,497 | 10/1954 | Van Nordstrand | 73—19 |
| 2,765,409 | 10/1956 | Hutchins et al. | 250—43.5 |
| 3,143,648 | 8/1964 | Bradley et al. | 250—43.5 |
| 3,177,700 | 4/1965 | Sier | 73—19 |
| 3,178,572 | 4/1965 | Williston | 250—43.5 |

RALPH G. NILSON, *Primary Examiner.*

W. F. LINDQUIST, *Assistant Examiner.*